Feb. 14, 1950   T. A. CAMPBELL   2,497,758
LUBRICATING FITTING
Filed Sept. 19, 1945
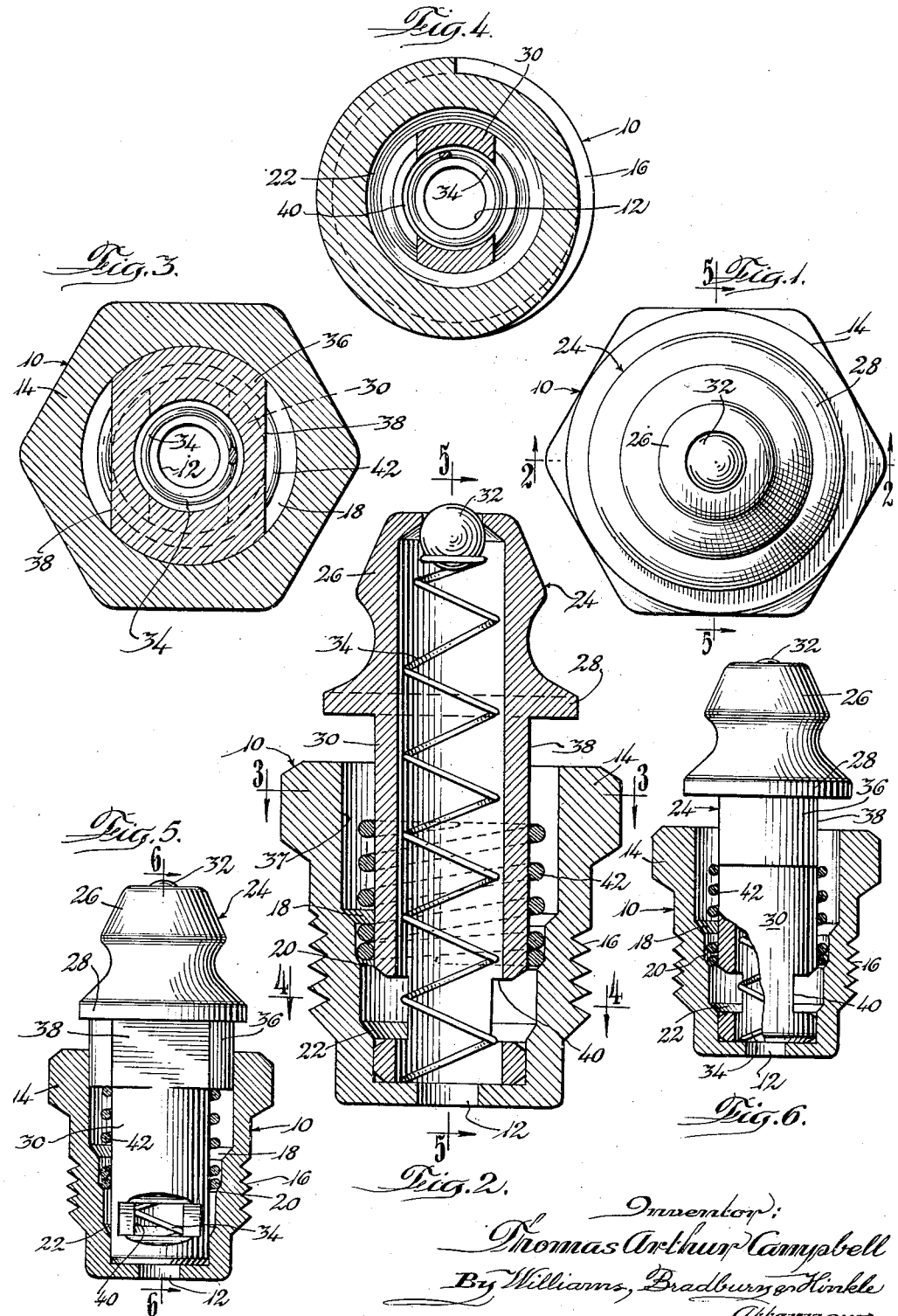
Inventor:
Thomas Arthur Campbell
By Williams, Bradbury & Hinkle
Attorneys.

Patented Feb. 14, 1950

2,497,758

UNITED STATES PATENT OFFICE 2,497,758

LUBRICATING FITTING

Thomas Arthur Campbell, Chicago, Ill., assignor to Stewart-Warner Corporation, Chicago, Ill., a corporation of Virginia Application September 19, 1945, Serial No. 617,235

4 Claims. (Cl. 184—105)

This invention relates to a lubricant receiving fitting, and more particularly to such a fitting adapted to guard against the supply of an excessive quantity of lubricant to a bearing or the like.

Lubricant receiving fittings or nipples are commonly employed for receiving lubricant under pressure for the lubrication of bearings or other members with which the fittings are connected. Such fittings are usually provided with check valves to prevent escape of lubricant therefrom.

Many types of bearings are damaged when lubricant is applied to them at excessive pressures. For example, ball and roller antifriction bearings do not operate properly when they are packed with lubricant under greater than a predetermined relatively low pressure. Other bearings have oil seals or packings surrounding the moving part and if lubricant is forced into such bearings at excessively high pressure, the gaskets or packings may be "blown out" or otherwise damaged.

In the lubrication of bearings which may be damaged by applying the lubricant under excessive pressure, the operator of the grease gun connected to a fitting of usual construction has no way of determining when sufficient lubricant has been discharged into the bearing cavity and has no way of knowing when the pressure in the bearing cavity becomes excessively high.

It is therefore the primary object of the invention to provide an improved lubricant receiving fitting which permits the escape of lubricant when the lubricant pressure within the bearing being lubricated exceeds a predetermined value and thereby prevents damage to the bearing by excessive lubricant pressure, and, in addition, provides an indication to the grease gun operator that sufficient lubricant has been supplied to the bearing.

Another object is the provision of a lubricant receiving fitting for pressure lubrication of bearings or the like having a lubricant back pressure relief passage controlled by biased valve means.

A further object is the provision of a lubricant receiving fitting for pressure lubrication of a bearing or the like adapted to regulate maximum lubricant pressure in the bearing by biased valve means controlling a lubricant relief passage in the fitting.

A further object is to provide a lubricant receiving fitting having a relief opening normally closed by a resiliently biased obstruction, whereby fittings capable of relieving the lubricant at different pressures may readily be constructed by using resilient biasing means of different degrees of resiliency.

Other objects will appear from the following description, reference being had to the accompanying drawings, in which:

Fig. 1 is an enlarged plan view of the fitting;

Fig. 2 is a central vertical sectional view taken along the line 2—2 of Fig. 1;

Fig. 3 is a horizontal sectional view taken along the line 3—3 of Fig. 2;

Fig. 4 is a horizontal sectional view taken along the line 4—4 of Fig. 2;

Fig. 5 is a reduced vertical sectional view, with parts in elevation, taken along the line 5—5 of Fig. 2; and Fig. 6 is a central vertical sectional view, with parts in elevation and broken away, taken along the line 6—6 of Fig. 5.

The fitting comprises a casing 10 which is generally cup shaped and has an outlet 12 in the bottom thereof. The casing may be provided with suitable tool-receiving means, such as the hexagonal flange 14 adjacent the open end of the casing adapted to be engaged by a wrench, and an externally threaded portion 16 is provided on the casing for connection thereof adjacent a bearing or other member to be lubricated.

The interior surface of the casing is stepped to provide a shoulder 18 and an annular shoulder 20 intermediate the shoulder 18 and the bottom of the casing 10. The interior of the casing thus has three portions of progressively reduced size from the open end of the casing. A third shoulder 22 may be provided spaced slightly from the bottom of the casing 10 to provide a still further reduced portion adjacent the bottom of the casing.

A generally tubular member 24 is secured in the casing 10 and has a head portion 26 adapted to make a sealed connection with a coupler or nozzle usually connected by a flexible conduit to a grease gun or lubricant compressor, or similar source of lubricant under pressure. A skirt portion 28 may be provided on the member 24 spaced from the open end of the casing 10. The stem portion 30 of the tubular member 24 extends into the casing substantially to the bottom thereof. The tubular member 24 is in communication with the outlet 12 of the casing, and preferably the outlet 12 is somewhat smaller than the passage through the tubular member and disposed coaxially therewith. A check valve is provided in the tubular member, comprising a ball 32 adapted to close the opening in the head portion 26, and a spring 34 biasing the ball to closed position, the spring 34 having one end engaging the ball and the other end bearing on the bottom of the casing 10 about the outlet.

A collar portion 36 on the tubular member 24 has a press fit in the open end of the casing 10. To provide communication between the interior and exterior of the casing at the open end thereof, passages are provided by the collar portion 36. As shown in the drawings, particularly in Fig. 3, two ports or passageways are provided for the escape of lubricant from the interior of the tubular member 24 to the atmosphere, the upper ends of these passageways being segmental in cross section and comprising the space between flat surfaces 38 formed on the collar portion 36 and the largest bore 37 in the casing. Adjacent the bottom of the casing 10, and intermediate the casing bottom and the annular shoulder 20, the tubular member is provided with a pair of ports 40, which may conveniently be formed by milling or otherwise forming a pair of slots in the wall thereof.

As will be clear from the drawings, the stem 30 of the tubular member 24 is smaller in diameter than the intermediate size bores in the casing 10. The tubular member and casing thus define an annular chamber or passageway which is wider above the shoulder 18 between the shoulders 18 and 20. This chamber or passageway communicates with the bearing or other member to be lubricated through the ports 40, the interior of the tubular member 24, and the outlet 12. Lubricant back pressure thus may be relieved through this chamber or passageway. The passageway is normally closed by biased valve means comprising a coil spring 42 which surrounds the tubular member and has one end bearing on the lower surface of the collar portion 36 and the other end seated on the annular shoulder 20. The spring 42 is formed of material having a thickness such as substantially to close the annular space between the member 24 and the reduced portion of the bore in the casing between the shoulders 18 and 20. The end of the spring bearing on the shoulder 20 is preferably formed as an annulus to substantially close the space about the tubular member.

In operation, when lubricant is forced under pressure through the tubular member 24, is passes through the outlet 12 of the casing 10 to the bearing or other member to be lubricated.

When sufficient lubricant has been supplied to the bearing, the pressure therein will build up and when it attains a value approaching that at which it might damage the bearing structure, the lubricant will compress the spring 42 so that the lower turns thereof, which normally lie in the annular space between the shoulders 18 and 20, will be forced upwardly beyond the shoulder 18 and permit relatively free flow of the lubricant through the escape or vent ports at the upper ends of the previously described passageways. These passageways are of sufficient size and offer sufficiently low resistance to the flow of lubricant that even though the operator does not know that the grease is oozing from the ends of the relief ports, the grease may flow from these ports as fast as it is being supplied by the lubricant compressor. Thus it is impossible for the operator to damage the bearing by applying thereto lubricant at excessively high pressure.

Ordinarily, the operator will observe the grease oozing from the relief ports and will discontinue the supply of lubricant to the bearing. The grease exuding from the relief ports thus supplies a simple indicator of the fact that the bearing is filled with lubricant at the desired pressure. Although the spring 42 is shown as of a thickness to fill the space between the tubular member 24 and the inner surface of the casing between the shoulders 18 and 20, it will be understood that the spring need be of a thickness only sufficient to close the space between the tubular member and the radially inner edge of the shoulder 20. From the foregoing, it will be clear that the pressure at which the lubricant will commence flowing past the spring valve will depend to the greatest extent upon the strength of the spring 42. It is therefore possible to produce fittings which will relieve the lubricant at different pressures, merely by utilizing springs of different degrees of resiliency or strength.

In the event that lubricant in the bearing has become hardened, or passage of lubricant is otherwise obstructed or hindered, or if some other abnormal condition exists, excessive back pressure of lubricant being supplied to the bearing will occur within an abnormally short period of time, and the relief of this back pressure by flow of lubricant out of the open end of the casing within such a short period will indicate that some condition exists which should be corrected.

Although the restrictions in the annular space between the tubular member 24 and the interior of the casing 10 are illustrated and described as provided by shoulders on the interior of the casing, it will be understood that these restrictions might be provided by forming the casing 10 with a uniform interior surface instead of a stepped surface, and forming suitable shoulders on the exterior of the tubular member. The construction illustrated is preferred, however, because of the convenience and simplicity of forming the tubular member without such shoulders or projections.

Having thus described my invention, what I claim as new and desire to secure by Letters Patent is:

1. A lubricant receiving fitting comprising a generally tubular casing having a closed end with an outlet therein, a generally tubular member of smaller diameter than the interior of said casing communicating at one end with said outlet and having the opposite end thereof projecting from the open end of said casing, means for securing said tubular member centrally in said casing to provide a space between said member and casing communicating with the open end of said casing, a port in said tubular member adjacent said outlet communicating with said space, means in said space between said port and said open casing end restricting said space, and a coil spring surrounding said tubular member and having an end thereof normally closing said space at the restricted portion thereof, said spring end being movable toward the unrestricted portion of said space to permit communication between said outlet and said open end of the casing.

2. A lubricant receiving fitting comprising a generally tubular casing having a closed end with an outlet therein, a generally tubular member of smaller diameter than the interior of said casing, an enlarged collar portion engaging the interior of said casing to secure said member in said casing with an annular space defined therebetween, said collar portion including means providing a passage between said space and the open end of said casing, a port in said tubular member adjacent said outlet and communicating with said space, shoulder means between said port and said collar portion restricting said space, and a coil spring surrounding said tubular member having one end abutting said collar portion and the other end formed to provide an annular member disposed adjacent said shoulder to close said annular space at said restricted portion and movable in the direction of said collar portion against the force of said spring to permit communication between said outlet and said open casing end.

3. A lubricant receiving fitting comprising a generally tubular casing having a closed end with an outlet therein, a generally tubular member of smaller diameter than the interior of said casing, an enlarged collar portion on said tubular member engaging the interior of said casing to secure said member in said casing with an annular space defined therebetween, said collar portion including means providing a passage between said space and the open end of said casing, a check valve in said tubular member, a port in said tubular member adjacent said outlet and communicating with said space, shoulder means between said port and said collar portion restricting said space, and a coil spring surrounding said tubular member having one end abutting said collar portion and the other end formed to provide an annular member disposed adjacent said shoulder to close said annular space at said restricted portion and movable toward the open end of the casing against the force of said spring to permit communication between said outlet and said open casing end.

4. A lubricant receiving fitting comprising a generally cup-shaped casing having a discharge opening in the bottom thereof, a generally tubular member fixed in said casing and communicating with the discharge opening, said casing and member defining therebetween a chamber open to the atmosphere at the upper end thereof, the chamber including a restricted annular portion, a port in said tubular member communicating with the chamber beneath the annular portion thereof, and a coil spring having its upper end fixed and having at least one of its lower turns psitioned in the restricted annular portion of the chamber, said spring yielding sufficiently to permit the lower turns of the spring to be moved upwardly out of said restricted annular portion of the chamber when the pressure within the lower portion of the chamber exceeds a predetermined maximum value.

THOMAS ARTHUR CAMPBELL.

REFERENCES CITED

The following references are of record in the file of this patent:

UNITED STATES PATENTS

| Number | Name | Date |
| --- | --- | --- |
| 1,216,919 | Ashelman et al. | Feb. 20, 1917 |
| 2,017,978 | Lapp | Oct. 22, 1935 |
| 2,171,590 | Milliken | Sept. 5, 1939 |
| 2,217,739 | Ehnts | Oct. 15, 1940 |
| 2,232,359 | Barks | Feb. 18, 1941 |

FOREIGN PATENTS

| Number | Country | Date |
| --- | --- | --- |
| 11,371 | Germany | 1903 |
| 188,553 | Germany | 1907 |